United States Patent [19]

Ward et al.

[11] 4,198,103
[45] Apr. 15, 1980

[54] DIFFERENTIAL TRACK ASSEMBLY FOR A CABLE LAYING MACHINE

[76] Inventors: Eugene A. Ward, 1431 Bullis Rd., Elma, N.Y. 14059; Gerald G. Ward, 8 S. 290 Murray Dr., Naperville, Ill. 60540

[21] Appl. No.: 891,509

[22] Filed: Mar. 30, 1978

Related U.S. Application Data

[63] Continuation-in-part of Ser. No. 663,478, Mar. 3, 1976, abandoned.

[51] Int. Cl.² .......................... B60S 1/62; B62D 55/24
[52] U.S. Cl. ................................. 305/12; 305/35 EB; 305/38; 180/9.2 R; 180/9.22
[58] Field of Search ................ 305/56, 57, 35 EB, 38, 305/37, 33, 12; 180/9.2 R, 9.22; 74/202, 203, 206, 214, 216, 216.5, 219

[56] References Cited

U.S. PATENT DOCUMENTS

| | | | |
|---|---|---|---|
| 1,639,536 | 8/1927 | Saives | 305/56 X |
| 2,254,592 | 9/1941 | Berkeley | 74/216.5 |
| 2,898,965 | 8/1959 | Eddy | 305/56 X |
| 3,105,536 | 10/1963 | Cappa | 305/35 EB X |

*Primary Examiner*—Charles A. Marmor

[57] ABSTRACT

A track assembly for a vehicle comprising powered wheels at each side, and an endless track sleeved over the wheels on each side having solely a smooth driven surface friction contact with the associated wheels, whereby when the driving torque overcomes the coefficient of friction the wheels are caused to momentarily slip until the friction drive becomes reestablished and in which novel scrapers are provided to maintain the driven surface clean of mud and rocks and having guides for maintaining the tracks on the wheels.

14 Claims, 10 Drawing Figures

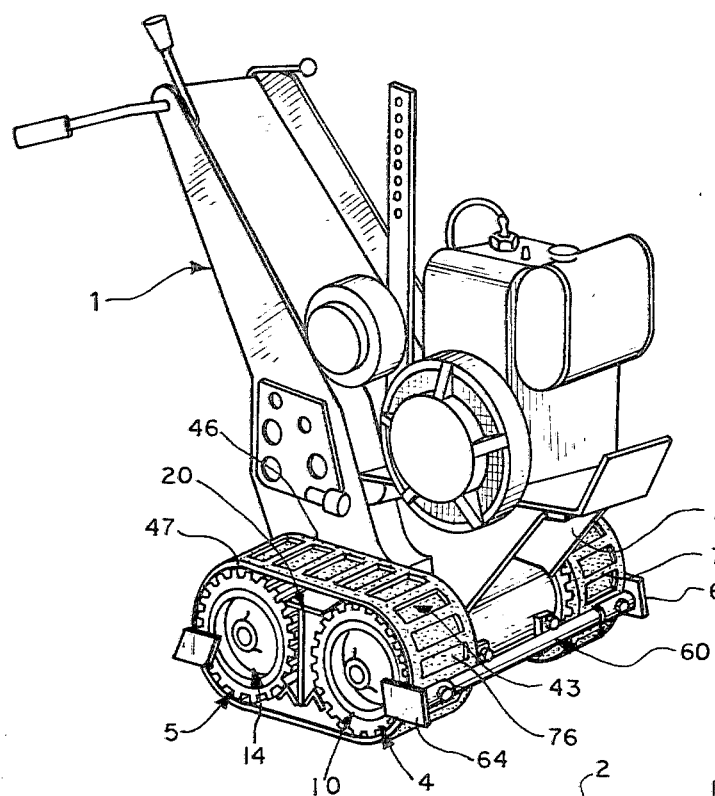
FIG. 1
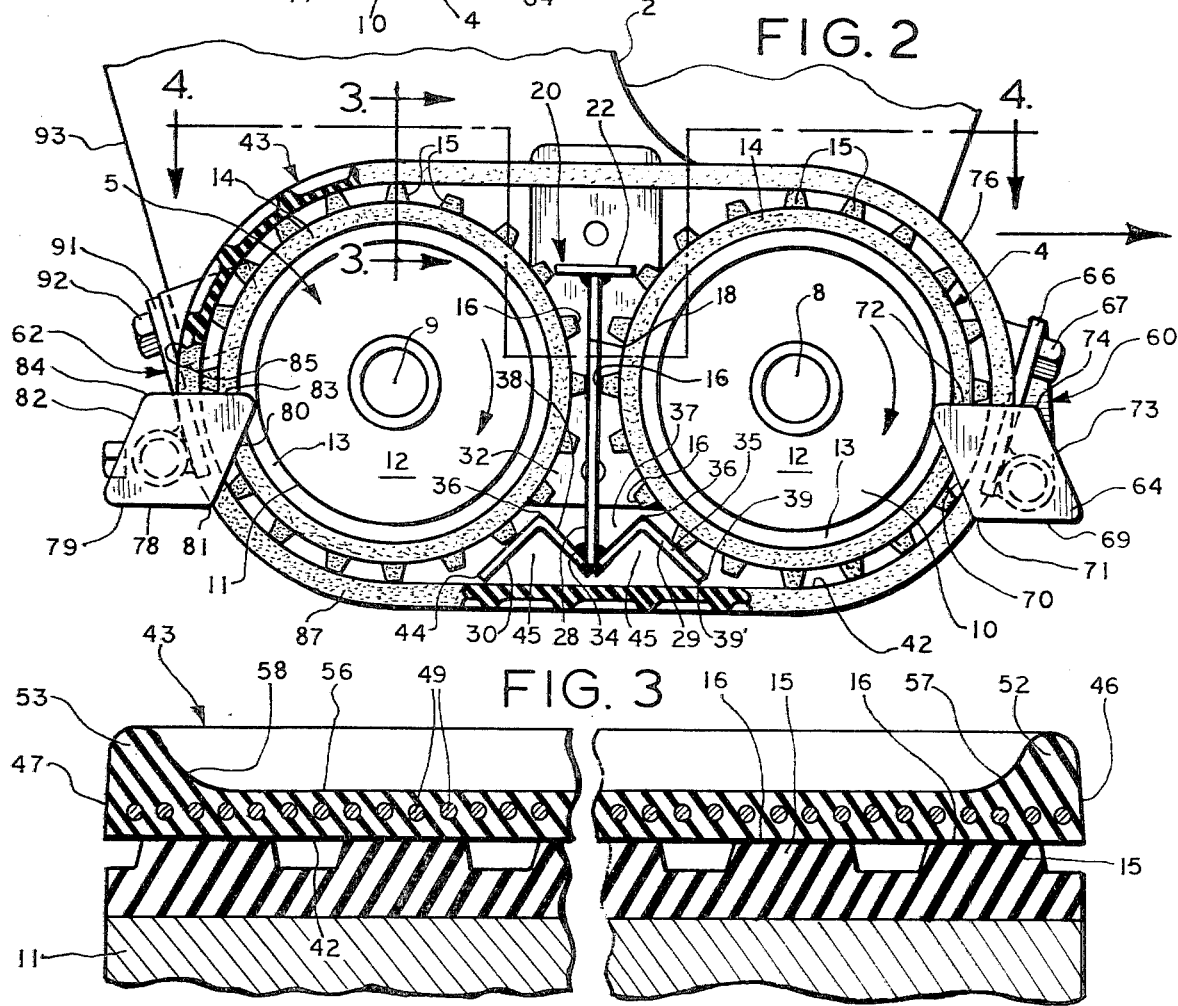
FIG. 2
FIG. 3

DIFFERENTIAL TRACK ASSEMBLY FOR A CABLE LAYING MACHINE

This application is a continuation-in-part of our U.S. application Ser. No. 663,478 filed Mar. 3, 1976, now abandoned.

DISCUSSION OF THE PRIOR ART

As best known to the applicants, track drives are usually of the cog type in which ribs or teeth are provided on the interior of the track, which mesh with teeth on the wheels. This provides a positive drive from the wheels to the tracks. No slip of any nature is tolerable and in fact is deleterious to the functioning of the equipment.

SUMMARY OF THE INVENTION

This invention pertains to the provision of endless tracks onto a vehicle, particularly to a manually manipulatable type such as a cable layer which is adapted to be operated over various terrain such as grassed areas, mud flats or sand, etc.

The invention is particularly directed to a novel track assembly in which the wheels at each side of the unit such as shown in U.S. Pat. No. 3,713,300 are positioned to run within endless tracks to drive the tracks and thus the unit, the wheels solely driving the track through frictional engagement, whereby upon the tracks encountering an obstruction beyond a predetermined coefficient of friction between the wheels and track, the wheels will slip within the track until the condition is removed, thereby preventing the track from tearing up the lawn, if riding upon such, the correction being attended to simply by the operator momentarily pushing on the unit.

A further object is to provide a novel drive in which the track is stretched over a front and a rear wheel at each side of the unit to provide the prerequisite driving contact between the wheels and track.

The invention also encompasses an arrangement of wheels and track, wherein the wheels are horizontally spaced and the track comprises a belt having a cleated outer side and a smooth faced inner side which is trained about the wheels, and wherein the belt has at least a lower horizontal run which has a length extending between the wheels over which there is positioned a novel scraper assembly for maintaining the belt clear of rocks or other debris which would normally lodge between the belt and wheels, thereby causing a malfunction or rapid deterioration of the belt.

A corollary object is to provide such a novel scraper assembly which not only scrapes the belt, but which also functions to scrape the wheel treads and which is constructed to sift the dirt, etc. to opposite edges of the belt, so as not to reintroduce it into the operating parts.

The invention also provides combination track cleaners and retainers which function to maintain the edges of the belt clean and flank the edges, thereby confining the belt on the wheels.

These and other objects and advantages inherent in and encompassed by the invention will become more apparent from the specification and the drawings, wherein:

FIG. 1 is a perspective view of a cable layer incorporating the invention;

FIG. 2 is an enlarged side elevational view of the track and wheel assembly of the unit;

FIG. 3 is an enlarged cross-sectional view taken substantially on line 3—3 of FIG. 2;

DESCRIPTION OF THE INVENTION

Figure 4:
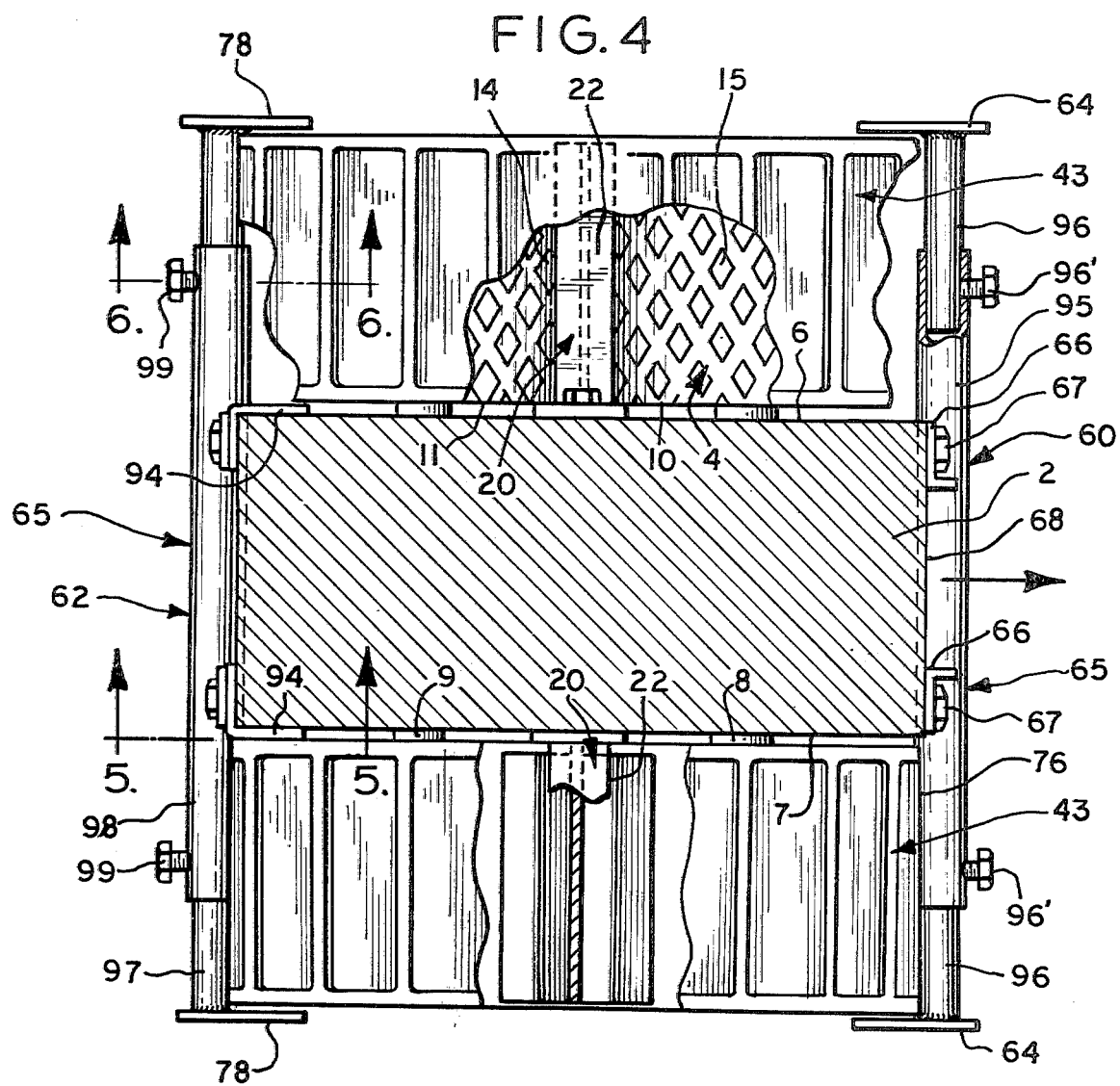
FIG. 4 is a sectional view taken substantially on line 4—4 of FIG. 2.
Figure 5:
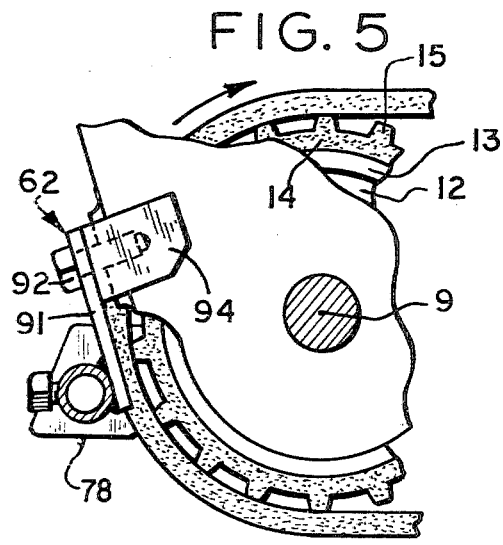
FIG. 5 is an enlarged sectional elevational view taken substantially on line 5—5 of FIG. 4.
Figure 6:
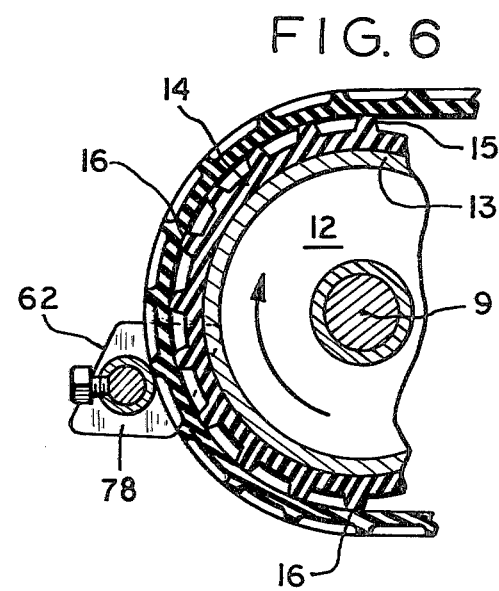
FIG. 6 is a cross-sectional view taken substantially on line 6—6 of FIG. 4.

Describing the invention in detail and having particular reference to the drawings, there is shown a cable laying machine generally designated 1 including a frame 2 in the form of a gear case 3 which has front and rear wheel and axle assemblies 4 and 5 journalled in side walls 6 and 7.

The assemblies 4 and 5 comprise in addition to the axles 8 and 9, front and rear drive wheels 10 and 11, each of which comprises a metal disk 12 and an annular rim 13 to which there is bonded a preferably cleated tread 14 which is provided with a plurality of equally spaced outwardly extending ribs 15, 15 which terminate in outer flat edges 16 bounded within a common circular periphery.

Figure 7:
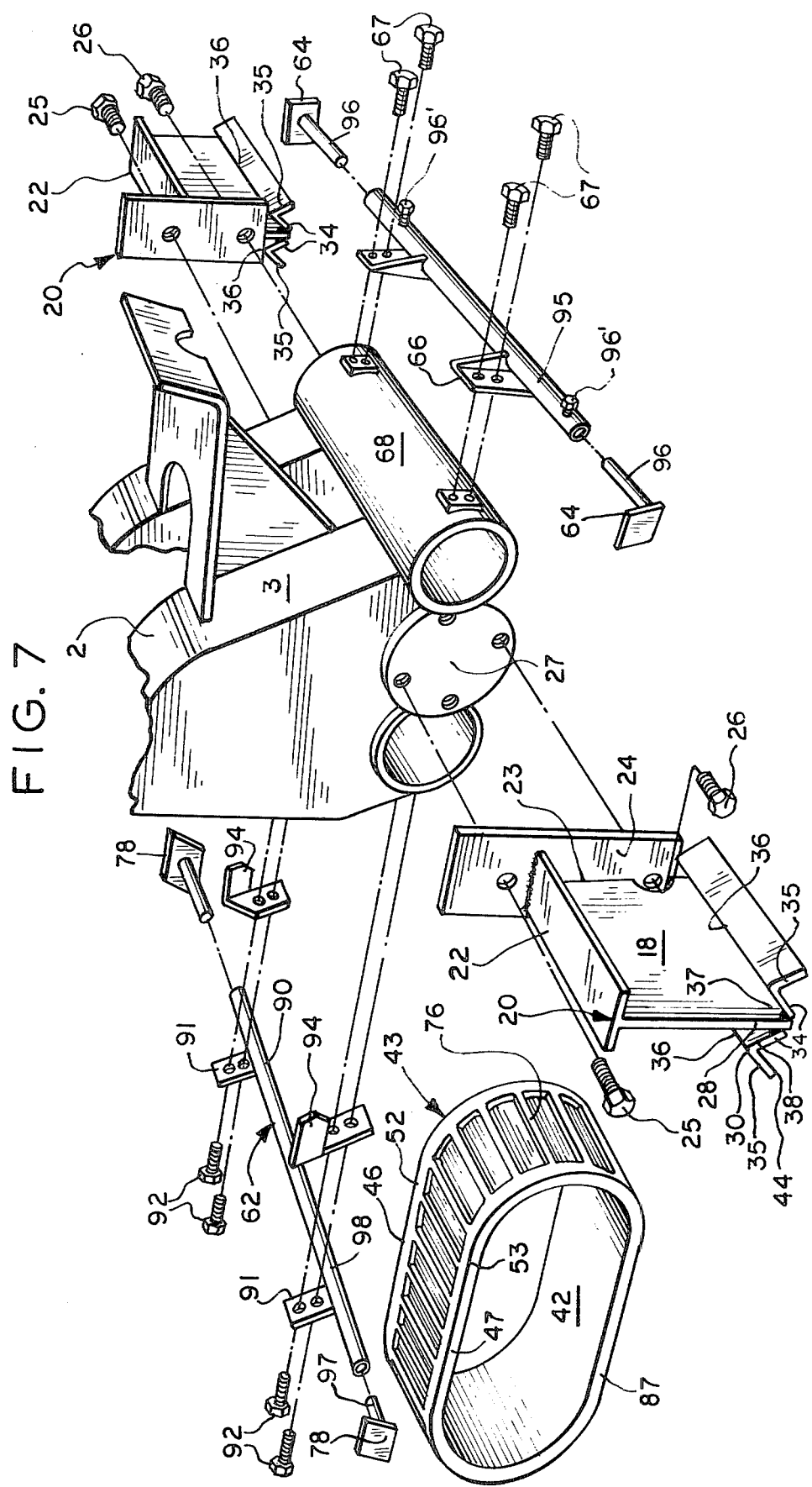
FIG. 7 is an exploded perspective view of the novel parts.

The wheels are closely spaced tangentially to a vertical web 18 of a T-shaped support 19 of an intermediate scraper assembly generally designated 20. The web 18 extends generally parallel to the axles 8 and 9 and at its upper end is formed integral with the head flange 22 and at its inboard edge 23 is weld-connected with the same edge of flange 22 to the outboard side 24 of the mounting plate 24 (FIG. 7), which is bolted by bolts 25, 25 to the outer side of the side wall pad 27 of the chassis or frame of the unit. The lower edge portion 28 of the web 18 is connected to a pair of front and rear scrapers 29, 30 which flank the portion 28 and fit within the upwardly converging space 32 formed between the peripheries of the front and rear wheels.

Each scraper 29, 30 comprises an angle iron structure disposed as an inverted V, having a pair of flanges 34, 35 converging upwardly into an apex 26. The lower edges of the inner flanges 34 are weld-connected to opposite sides of the lower portion 28 of the support web 18, and define upwardly open troughs 37, 38, and the outer flange 35 of the front scraper is disposed tangentially to the periphery of the front wheel and presents at its lower edge an upper corner 39 in scraping relation to the outer edges of the lugs or ribs 15, 15 of the front wheel. The lower edge also presents a lower corner 39' which is disposed in close proximity to the smooth-faced flat interior surface 42 of the traction belt 43 for scraping it off from mud, grit, stones and the like.

Similarly the outer flange 35 of the rear scraper is disposed tangentially to the periphery of the rear wheel and presents the sharp apex 36 in scraping relation to the lugs of the rear wheel which pass in close proximity thereto. The lower edge of the rear scraper presents a sharp front lower corner 44 in close scraping proximity to the inner side of the track belt, and any debris will rail within the downwardly open pocket 45 and drift out of the ends thereof beyond the lateral edges 46, 47 of the track belt.

The track belt 43 is made of elastomer material such as neoprene fiber glass impregnated urethane or any other similar rubber-like material such as used in automobile tires, and if desired may be composed partially of fabric and also preferably may incorporate a plurality of endless bands of equally spaced steel or alloy wire 49 imbedded within the elastomer web between the inner and outer sides 46, 47 thereof. The outer side of the belt may be formed along its edges 46, 47 with thick inboard and outboard beads 52, 53, which define a depression 54 therebetween. A plurality of equally spaced ribs 55 are integrally formed with surface 56 and extend widthwise of the belt and at their ends merge into the interior sides 57, 58 of the beads.

The belt is practically not stretchable to tightly fit about the front and rear wheels, and the surfaces of the treads of the wheels and of the interior of the belt are determined to drive to a predetermined torque load and to slip thereafter. Thus, various surfaces and materials as well known may be used to obtain the desired drive-transmitting power loads.

To keep the belts from sliding off their respective driving wheels, combination front and rear scraper and retainer assemblies 60, 62 are provided. The front assembly 60 comprises outboard guides on blades 64, 64, which are diamond-shaped flat plates supported to opposite ends of a mounting bar 65. The guides are positioned slightly outwardly of the outer edges 47 of the two belts and the bar 65 is provided with lugs 66, 66 which are secured by bolts 67, 67 to the forward portion 68 of the unit frame. The guides 64 have lower downwardly converging edges 69, 70 which merge into an apex 71 which is preferably aligned laterally with the adjacent bead 53. The upper edges 72, 73 converge into an apex 74 which is preferably positioned forwardly of the front end 76 of the belt, the edge 72 preferably extending radially with respect to the adjacent wheel and projecting fore and aft of the rim of the adjacent wheel.

The rear scraper assembly comprises diamond shaped end scrapers 78 which are positioned outwardly of the outer edge beads 53, 53 of the belts. The lower edges 79, 80 of each scraper 78 converge into an apex 81 which is laterally aligned with the adjacent bead 53 and disposed closely to the outer edge of the bead. The forward edge 80 of each rear outboard scraper extends diagonally upwardly and forwardly in a dirt or mud shedding attitude. The upper edges 82, 83 converge into an apex 84 which is preferably disposed rearwardly of the rear end 85 of the belt. Edge 83 is substantially horizontal, as is edge 72 of the front scraper. The bottom tension or advance run 87 of the belt moves rearwardly normally, except when the unit is driven in reverse for short periods. Thus the primary mud removing is accomplished by the apical point 81 and the upper edge 72 is only a secondary remover. Upon reverse, the point 71 performs the primary scraping. Also, the arrangement maximizes the extent of surface on the outer guides which oppose the belt edges.

The rear assembly comprises a horizontal mounting bar 90 which has lugs 91 attached by bolts 92 to the rear side 93 of the frame. The rear guide assembly is provided with a pair of inboard guide plates or pads 94, 94 secured to the frame and which embrace the frame and which oppose the inner edges or beads 52 of the belts.

It will be noted that the front bar has a hollow center portion 95 and that stub rods 96 are actually connected at their outer ends to the respective front outer guides 64, 64, and that set screws 96' are threaded through the tube adjacent to its ends, which are adapted to be tightened against respective rods after they have been adjusted to position the guides 64 midwise and also circumferentially.

The outboard rear guides or blades 78 are provided with integral stub rods 97 which fit into the ends of the center tube 98 and are secured after lateral and circumferential adjustment by the set screws 99 threaded through the tube 98 and in contact with the rods 97.

Thus a practical and effective simple track assembly has been provided with a novel slip drive serving in effect as a differential. The ribs or lugs on the wheels are shown diamond-shaped and are designed to obtain the proper traction against the smooth belt surface and also are self-cleaning.

Figure 8:
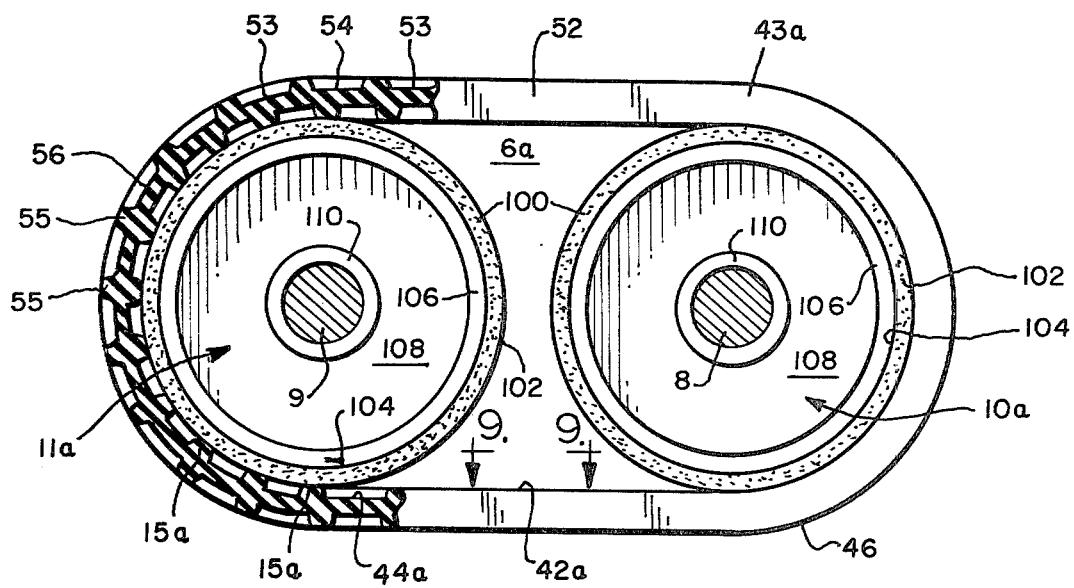
FIG. 8 is a side elevational view partly in section illustrating a further modification of the invention.
Figure 9:
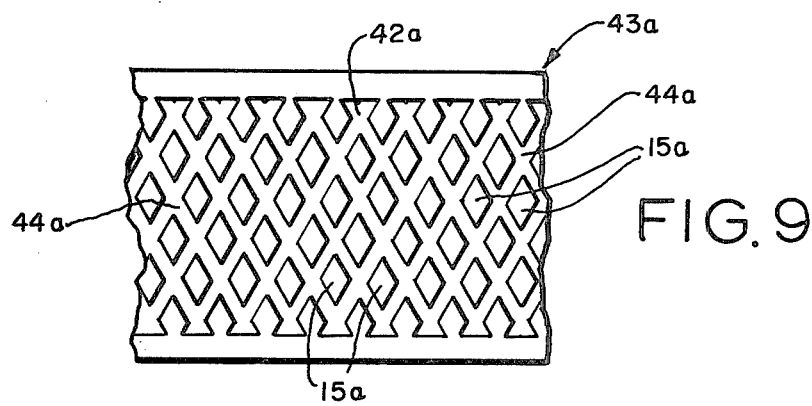
FIG. 9 is a fragmentary enlarged view taken substantially on line 9—9 of FIG. 8.

Embodiment of FIGS. 8 and 9

In this embodiment parts common to the previous embodiment are identified with the same reference numerals.

The track belt 43a is made of the same material as belt 43. However, instead of having a smooth interior surface it is provided with a patterned surface designated 42a. The pattern is preferably made up of raised diamond-shaped pads 15a, 15a, although they may be circular provided that the arrangement is such that they form diagonal grooves 44a across the belt for sifting dirt and stones axially of the wheels 10a, 11a which are mounted on shafts 8 and 9 outwardly of the side walls of the machine, it being observed that only wall 6a is shown, there being one on the opposite side of the machine as in the previous embodiment.

In this embodiment of FIGS. 8 and 9, the tread 100 of each wheel is a smooth outer cylindrical surface formed on a high strength elastomer band 102 of urethane material which on its inner periphery 104 is bonded to a steel cylindrical rim 106 on the outer end of the felly 108 of the wheel, the felly having a hub 109 which mounts on the respective shaft 8 or 9. The same operating characteristics between the belt and the wheels prevails as in the previous embodiment in that the coefficient of friction is chosen to insure slippage between the belt and wheel surfaces 100 before the grass sod upon which the exterior side 46 of the belt traverses.

Figure 10:
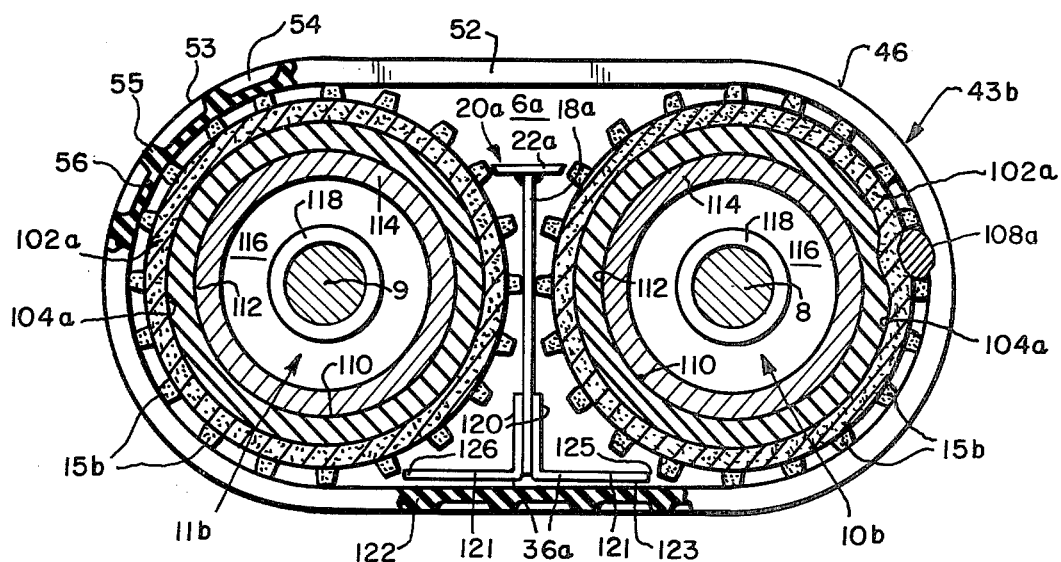
FIG. 10 is a side elevational view partly in vertical section illustrating a still further modification.

Description of FIG. 10

In this embodiment as well as that shown in FIGS. 8 and 9, parts identical with those shown in the embodiment of FIGS. 1-7 are identified with the same reference numerals.

In this embodiment the wheel treads are patterned and the interior of the belt 43b is smooth. The tread portion of each wheel 10b, 11b is formed of a high strength cylindrical band 102a of urethane material and the raised pads 15b, 15b may be of the same diamond-shape configuration as in FIG. 4 or may be cylindrical. The band 102a has an inner periphery 104a which is bonded to the outer periphery of a cylindrical band 106a of elastomer high strength urethane material which is preferably a semi-flexible urethane foam of microcellular construction 30 to 60 pounds per cubic foot.

The bands 102a, 106a are adapted to flex to accommodate rocks or stones as shown at 108a. The interior cylindrical surface 110 of band 106a of each wheel is bonded to a complementary surface 112 of a metal rim 114 formed integral with web 116 of the related wheel. The web 116 is joined to a hub 118 which is adequately keyed to the respective shaft 8 or 9.

The soft treads on the wheels are compressed by the rocks or stones, which when they exit from between the belt and the tread pop out onto the belt against the edge of scraper member 22a of scraper 20a, shown in FIG. 10 and omitted in FIG. 8 for clarity. Member 22a is mounted on the upper end of support plate 18a which extends between the wheels and at its lower end mounts scrapers 36a, 36a, each of which is an angle iron having a vertical web 120 which is welded to the respective side of plate 18a and a horizontal web 121 which is closely spaced to the interior surface of the bottom run 122 of the belt between the wheels and provides a flat back up surface 123 opposing the interior side of the belt portion thereadjacent thus providing support therefore as when it rides over hillocks or small projections on the ground. The free edges 125,125 of the respective webs 121 extend to the peripheries of the front and rear wheels in scraping relation thereto.

Thus it will be seen the upper scraper 20a and the lower scrapers extend to the wheel peripheries and serve to scrape dirt off the wheels as well as the smooth interior surface of the belt.

It will be apparent that having described preferred forms of the invention, various embodiments will now become evident to those skilled in the art which fall within the scope of the appended claims.

We claim:

1. A track drive for a machine having front and rear traction wheels at least certain of which are driven, said drive comprising: an endless belt trained about said wheels and having a flat, smooth interior drive-transmitting surface in frictional engagement with the peripheral surfaces of said front and rear wheels, said surfaces of the wheels and belt surfaces having predetermined torque transfer capacity and being slippable beyond said capacity, and said wheels having discretely spaced drive transmitting areas providing limited slippable contact between said wheel and belt surfaces, and said belt having a plurality of external ground engaging means for gripping the ground during traverse of the belt over the terrain, said areas and means being proportioned to permit slippage between the driven wheels beyond a certain torque limit and the belt while said means on the belt grip the terrain, and said spaced drive transmitting areas of said wheels comprising a plurality of pads spaced axially and circumferentially of the respective wheels and providing limited areas of engagement with the belt surface, and defining spiraled passages about the wheels for sifting dirt.

2. The invention according to claim 1, and scraper means interposed between said wheels for scraping both wheel peripheries and having edges in scraping relation to the belt surface and having means for collecting the scrapings and guiding the same beyond the edges of the belt.

3. A track drive for a machine having front and rear traction wheels at least certain of which are driven, said drive comprising: an endless belt trained about said wheels and having a flat, smooth interior drive-transmitting surface in frictional engagement with the peripheral surfaces of both wheels, said surfaces of the wheels and belt surface having a predetermined torque transfer capacity and being slippable beyond said capacity, and scraper means interposed between said wheels and having means for scraping both of the wheel peripheries and having edges in scraping relation to the belt surface, and said scraper means comprising a vertical support extending between the peripheries of said wheels and having a lower portion proximate to said belt surface, and said scraper means comprising front and rear scrapers positioned respectively in front of and behind said support and connected to the lower portion thereof, and each front and rear scraper having a portion extending to the periphery of the respective wheel and providing an edge in scraping relation to said belt surface.

4. The invention according to claim 3 and said front and rear scrapers defining debris-receiving troughs at opposite sides of said mounting plate.

5. The invention according to claim 4 and each scraper being of inverted-V shape and providing downwardly narrowing debris-admitting pockets extending widthwise of the belt and having open opposite ends for discharging debris beyond the lateral edges of the belt.

6. The invention according to claim 3 and said wheels and belt disposed at each side of the machine, combination guides and scrapers mounted at the front and rear of the machine and having blades outboardly of the wheels in close proximity to the outboard edges of the belts, said machine having a frame intermediate said belts in close proximity to the inner edges thereof.

7. The invention according to claim 6 and each blade having converging upper edges and converging lower edges, each defining an apical point, and means mounting said blades for adjustment of said blades with its edges disposed in selected singular position to the edge of the related belt.

8. The invention according to claim 3 and front and rear combination guides and scrapers embracing the belt along its edges for removing dirt therefrom and holding the belt onto said wheels and presenting converging scraping surfaces.

9. A track drive for a machine having front and rear traction wheels at least certain of which are driven, said drive comprising an endless track belt trained about said wheels and having a flat, smooth interior drive-transmitting surface in frictional engagement with the peripheral surfaces of said front and rear wheels, said surfaces of the wheels and belt surface having a predetermined torque transfer capacity and being slippable beyond said capacity, and scraper means interposed between said wheels and having means for scraping the wheel peripheries and having edges in scraping relation to the belt surface, and front and rear combination guides and scrapers embracing the belt along its edges for removing dirt therefrom and holding the belt onto said wheels and presenting converging scraping surfaces, and said scraper means having a front portion presenting a leading scraping edge against the belt surface and having a rear scraper presenting a trailing scraper edge against the belt surface.

10. A track drive for a machine having front and rear traction wheels at least certain of which are driven, said track drive comprising: an endless belt trained about said wheels and having flat, smooth interior drive-transmitting surface in frictional engagement with the peripheral surfaces of said front and rear wheels, said surfaces of the wheels and belt surfaces having a predetermined torque transfer capacity and being slippable beyond said capacity, and said wheels having discretely spaced drive transmitting areas providing limited slippable contact between said wheel and belt surfaces, and said belt having a plurality of external ground engaging means for gripping the ground during traverse of the belt over the terrain, said areas and means being proportioned to permit slippage between the driven wheels beyond a certain torque limit and the belt while said means on the belt grip the terrain, and scraper means interposed between said front and rear wheels and having a support and upper and lower scrapers extending over and beneath said front and rear wheels to the peripheries thereof in scraping relation thereto and said lower scrapers opposing a portion of the belt spanning the distance between said wheels and spaced slightly therefrom.

11. The invention according to claim 1 and said wheels having at least one band of soft elastomeric material capable of deflection to accommodate stones and the like between the periphery of the associated wheel and the interior of the belt.

12. The invention according to claim 10 and said scrapers having generally horizontal portions slightly spaced above the bottom run of the belt between said wheels.

13. The invention according to claim 10 and said wheels having tread portions formed of flexible material capable of deflection to accommodate stones and the like between the belt and respective wheel.

14. A track drive for a machine having front and rear wheel members at least certain of which are driven, said drive comprising: an endless belt member trained about said wheel members, said wheel and belt members and said belt member having surfaces in frictional engagement with each other, the surfaces on one of said wheel and belt members being smooth and the surface on the other of said members having discretely spaced drive-transmitting areas providing limited slippable contact between the wheel and belt surface members, and said belt having a plurality of external ground engaging means for gripping the ground during traverse of the belt over the terrain, said areas and means being proportioned to permit slippage between the driven wheel members beyond a certain torque limit and the belt member, while said means on the belt grip the terrain, and said spaced drive transmitting areas comprising a plurality of pads spaced axially and circumferentially of the respective wheel members and providing limited areas of engagement between the wheel members and belt member.

* * * * *